United States Patent
Remmick

(10) Patent No.: US 6,742,958 B2
(45) Date of Patent: Jun. 1, 2004

(54) STRONG, EXTERNALLY SMOOTH STRUCTURES

(75) Inventor: Richard D. Remmick, Lakewood, CO (US)

(73) Assignee: Richard Remmick, Peyton, CO (US)

( * ) Notice: Subject to any disclaimer, the term of this patent is extended or adjusted under 35 U.S.C. 154(b) by 0 days.

(21) Appl. No.: 10/298,727

(22) Filed: Nov. 18, 2002

(65) Prior Publication Data

US 2003/0072610 A1 Apr. 17, 2003

Related U.S. Application Data

(63) Continuation-in-part of application No. 09/442,327, filed on Nov. 17, 1999, now Pat. No. 6,481,918.

(51) Int. Cl.[7] ............................................... F16B 12/00
(52) U.S. Cl. ..................... 403/403; 403/205; 312/265.1
(58) Field of Search ............................... 403/201, 171, 403/403, 205, 375; 312/265.1, 265.2, 265.3, 265.4, 265.5

(56) References Cited

U.S. PATENT DOCUMENTS

| | | | |
|---|---|---|---|
| 2,730,421 A | * | 1/1956 | Burst et al. ............... 312/265.4 |
| 3,074,203 A | | 1/1963 | Pasky |
| 3,736,036 A | | 5/1973 | Brown et al. |
| 4,187,649 A | | 2/1980 | Chaffee |
| 4,242,969 A | | 1/1981 | Checkwood et al. |
| 4,273,462 A | | 6/1981 | Fukuchi |
| 4,368,998 A | | 1/1983 | Pestoor |
| 4,648,734 A | | 3/1987 | Daus, Jr. et al. |
| 5,169,258 A | | 12/1992 | Raynak |
| 5,451,115 A | | 9/1995 | Sayres |
| 5,470,139 A | * | 11/1995 | Hsiao ......................... 312/140 |
| 5,647,650 A | | 7/1997 | Daugherty et al. |
| 6,000,874 A | * | 12/1999 | Langer et al. ............... 403/230 |
| 6,527,278 B1 | * | 3/2003 | Norris ......................... 277/630 |

* cited by examiner

*Primary Examiner*—John R. Cottingham

(57) ABSTRACT

Components of and method for making a frame member framework having panel recesses accepting structural panels in a plane tangent to the exterior of the frame member. The tubes and fittings allow easy assembly of large structures. The panels secured within the panel recesses bear loads imposed on the structure and minimize torque at the fittings. The finished structure is streamlined, with flush junctions of all components. Alternative embodiments include panel recesses in angular or channeled shapes which act to secure the panels to the framework, and other panel securing attachment which are externally invisible on the completed structure. Panel securing means include screws, bolts, studs, pins, adhesives, welding and equivalents. End fittings are secured to frame members by any common and known ways. Frame members, fittings and panels may be made of any of a wide range of materials including metals, alloys, plastics, rubbers, wood, and composites. The panel recesses may engage the entire periphery of the panels, by traversing from frame member to fitting around the entire periphery of the panel.

16 Claims, 13 Drawing Sheets

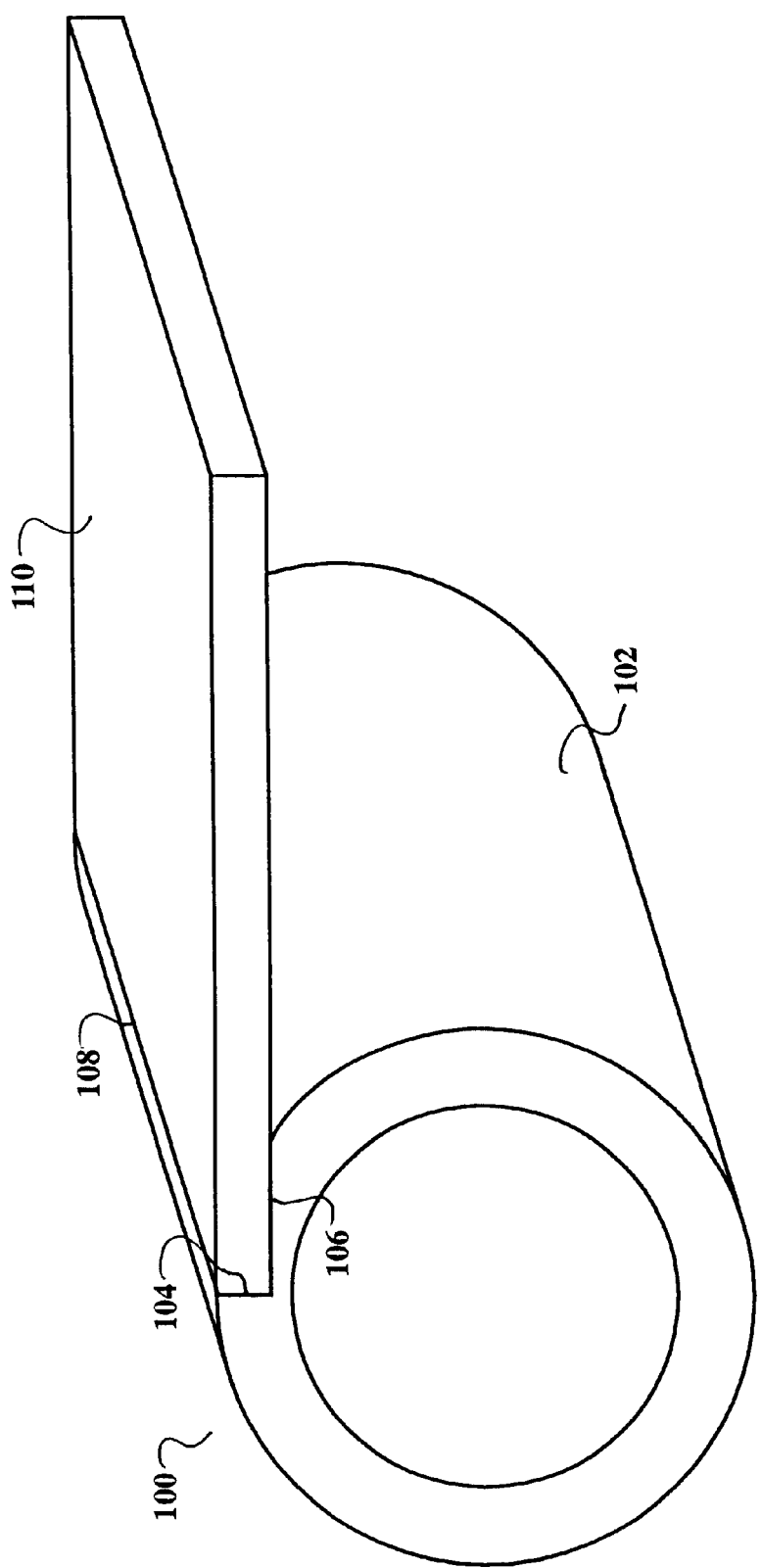

1114

STRONG, EXTERNALLY SMOOTH STRUCTURES

RELATED APPLICATIONS

This application is a Continuation-In-Part of U.S. application Ser. No. 09/442,327, filed Nov. 17, 1999 now U.S. Pat. No. 6,481,918.

BACKGROUND OF THE INVENTION

1. Field of the Invention

This invention relates to components for easy construction of structures, and more particularly to tubular frame components for easy construction of strong, externally smooth structures 2. Discussion of the Background It has long been known that combinations of tubes and connectors can be used to quickly create framework structures such as jungle-gyms and tents. By connecting tubes at their ends, the frameworks for geodesic domes, furniture and display cases can be created.

In a typical system, that of U.S. Pat. No. 5,169,258 (issued to Raynak), the fittings have cylindrical pins protruding from a semi-spherical body. PVC pipes are plugged onto the pins and so used to form even large structures such as the framework of a house. Other similar patents (U.S. Pat. No. 4,273,462 to Fukuchi; U.S. Pat. No. 4,242,969 to Checkwood et al.; U.S. Pat. No. 4,187,649 to Chaffee; U.S. Pat. No. 3,074,203 to Paksy) use various types of connectors to assemble pipes into larger structures such as display cases and coffee tables.

Other patents have used the same general technique with tubes having a square cross section: U.S. Pat. No. 5,820,289 to Kern et al.; U.S. Pat. No. 5,451,115 to Sayres; U.S. Pat. No. 4,368,998 to Pestoor; and U.S. Pat. No. 3,736,035 to Brown et al. There are certain advantages all such systems possess.

All the references listed above combine flexibility of design with ease of construction. By altering the arrangement of connectors and tubes new structures can be designed with great ease. Construction is also very easy, as the standardized connectors (also called fittings, joints or corners) and tubes (also called pipes or frame members) can be manufactured with great economy and put together quickly, with few or no special tools and by personnel having little experience or training. If the structure needs to be later modified, most such designs allow for easy disassembly and reassembly in a new configuration.

Such structures also tend to have certain general weaknesses. The completed structure is not a shell or panel type of structure and therefore stress, strain, and torsion, are all applied directly and fully at the couplings between fittings and pipes. Repeated cycles of use, or repeated applications of force to the completed structure, quickly deform the couplings and the structure tends to fall apart shortly.

Most of the references cited above do not refer to paneling. Those that do refer to paneling or shelves (for example, Brown and Kern) teach the panel or shelf as something requiring support from the tubular cross members. None of the references offer means for reducing the forces induced in the couplings, and none offer the panels as structural support for the framework. Finally, none of the references disclose structure allowing a flush, smooth tangential connection of paneling and circular section framework. In each case, paneling is taught as being radial to the tubular framework, not tangential.

One attempt to make the panels bear a structural burden can be seen in U.S. Pat. No. 5,647,650, issued Jul. 15, 1997 to Daugherty et al. In this case, the tubular support structures (there are no cross beams) have wide flanges which grip the end of a wall, thus helping to distribute imposed forces. The panels may be angled, rather than directly radial, but the wide flanges necessarily protrude from the completed structure. More importantly, that system is not actually modular, as it lacks fittings or connectors to connect the tubes, thus flexible design and assembly in to a wide variety of structures is not possible. The modular tubes of Daugherty ('650) are vertical members only, held in place on a base plate which may form the bottom of a wheeled cabinet. A complete framework, as such, is not present, and as with the above references, no structure is disclosed allowing a smooth, flush tangential connection of the paneling and the framework.

SUMMARY OF THE INVENTION

The invention consists of several components which interlock to form a strong, externally smooth structure. Tubes, rods or frame members are connected at their ends by fittings (also called joints or corners). Alternatively ends and fitting joints are part of the rod or frame member and attach to other ends or fitting of cross members. The fittings have faces which are symmetrical in external form and size the external surface of the tubes, rods or frame members, thus providing flush, smooth joints. The invention also has a panel which attaches to the framework. The panel connects to the side of the framework, on the plane defined by tangents of the tubes, rods or frame member rather than in the plane defined by the center axes of the tubes, or members, or some plane in between.

In order to provide a smooth, flush fit between the panel and the framework, a recess is provided in the frame member and fittings to accept the panel. The recess runs in a continuous groove along the length of a frame member along the matching faces of the fitting or ends, and then along the length of a second frame member matched to its end of the fitting. The recesses may engage the entire periphery of the panels, by traversing from tube to fitting around the entire periphery of the panel. They may also be discontinuous.

The recess forms a partial chordal section of the frame member if one were to view a circular cross section of a tube: one surface of the panel fits chordally into the tube's surface while an edge of the panel is substantially radial to the tube. In other embodiments the tangent chord is formed by the panel coming from the curved outer surface of the frame member, making a smooth transition from the panel to the frame member. Thus the recess has a first surface which is parallel to the panel's exterior surface, which will be referred to herein as the bottom of the recess. The recess also has one surface which is substantially normal to the panel's exterior surface, which will be referred to herein as the peripheral wall of the recess. The thickness of the panel is equal in depth to the recess as measured from the exterior surface of the tube or member to the bottom along the peripheral wall. The panel's exterior surface will thereby join smoothly to the member's exterior surface, and to the exterior surfaces of the fittings, without any step, gap, or discontinuity.

The fasteners used to hold the various components together may be disposed within the completed structure, resulting in an entirely smooth exterior. This requires that three different properties of the edge of the panel be shaped to exactly mate with the recess. First, the edge outline is the shape of the panel in two dimensions not including thickness. The edge outline may be a perfect square, a square with rounded corners, or other shapes. Also, the panel may not be wholly planar, instead being contoured in three dimensions, for example as a nose-cone or other bulbous shape.

The second property, the edge thickness, is generally equal to the depth of the recess. However, edge thickness may be less than the depth of the recess if, for example, the peripheral wall is situated at an angle to the radius of the tube, rather than being exactly radial. The balance of the panel is also usually, but not necessarily, the same thickness as the edge thickness.

Finally, the edge cross section is viewed in the plane normal to the surface of the panel and perpendicular to the axis of the tube. The shape of the edge cross section may either vary or be constant around the entire periphery of the panel. In one embodiment, the edge cross section will be complementary to the cross section of the recess in the plane perpendicular to the axis of the tube. The complementary edge cross section and recess cross section provide a snug and continuous contact between the panel edge and the recess. The three different properties of the edge of the panel thereby create the three dimensional shape exactly matching the space defined by the recess.

Smooth exteriors are beneficial in applications in which streamlining is important, such as trailers, or where cleanliness is important. Smooth exteriors are also useful any time projections on a structure would be disadvantageous, for example when projections might catch on external machinery. The form is also eye-pleasing.

The structure's interior will not be smooth or flush; because the panels are tangential to the exterior of the frame member, a cavity between the panel and the fittings and tubes of the framework is formed in the interior. There may also be visible on the inside of the structure, apparatus for securing the panels to the framework. For example a linear bead of welded metal may be used to secure the panel to the tubes and fittings. Stud/bolt and bracket combinations may also be used. This less eye-pleasing interior can be easily modified by making a structure with panels tangential to both sides of the framework. This embodiment not only allows both the structure's interior and exterior to be smooth, but also greatly strengthens the structure. The interior of the assembled structure should not be confused with the "tube interior," the interior of any tube components.

More importantly, the panel is a planar load bearing member. Most fitting and tube structures must absorb all imposed forces at the connection of cross pieces and corner, thereby allowing small forces to generate large torques. In contrast, the present invention takes advantage of the panel to provide a distributed load bearing structure: a monocoque shell. A load imposed on a frame member at the top of the structure will not be primarily transmitted to the fittings at the end of the frame member, but rather largely to the panel edge by the opposing peripheral wall of the tube's recess. The panel will in turn transmit the force to the recess of the tube on its far side, and so on until the force is absorbed.

It is therefore one object of the invention to provide an improved structural system allowing use of structural panels with easy assembly.

It is another object of the invention to provide a frame member and fitting framework which allows speedy assembly, yet which reduces the forces induced in the couplings between tubes and fittings.

It is another object of the invention to provide a structural system which allows easy assembly of a strong monocoque structure.

It is another object of the invention to provide a structural system allowing easy assembly of strong structures able to withstand numerous cycles of use.

It is another object of the invention to provide a structural system allowing use of structural panels yet allowing easy manufacture of the system components.

It is yet another object of the invention to provide a structural system allowing a smooth, flush joint between panels and elements of a tubular framework.

It is yet another object of the invention to provide a structural system allowing easy assembly of strong, streamlined structures.

It is yet another object of the invention of provide a structural system allowing a tangential joint between panels and elements of a framework.

It is yet another object of the invention to provide a method of constructing a frame member and fitting structure having structural panels and a smooth exterior.

It is yet another object of the invention to provide a structural system allowing construction of a structure which has no projecting flanges, fittings, or fasteners.

BRIEF DESCRIPTION OF THE DRAWINGS

FIG. 1c is a perspective view of a tube mated to a panel according to the preferred embodiment of the invention.

DETAILED DESCRIPTION OF THE INVENTION

The invention can be better understood by examination of the attached drawings.

Figure 1A:
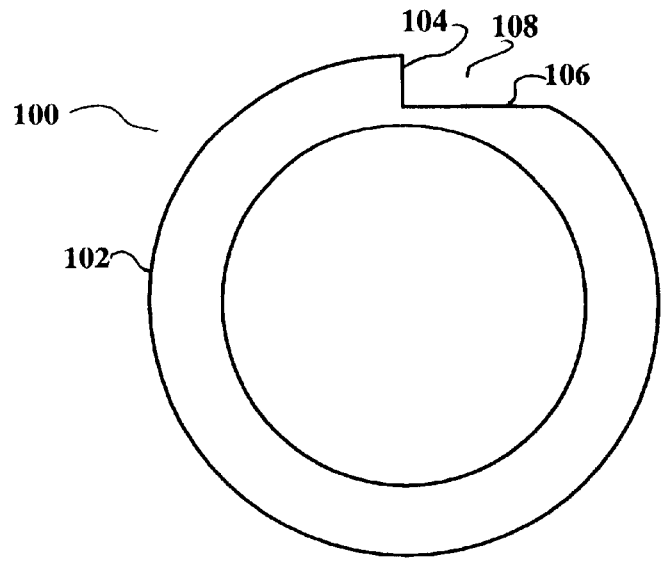
FIG. 1a is a cross sectional view of a tube, in a plane perpendicular to its axis, according to the preferred embodiment of the invention.
Figure 1B:
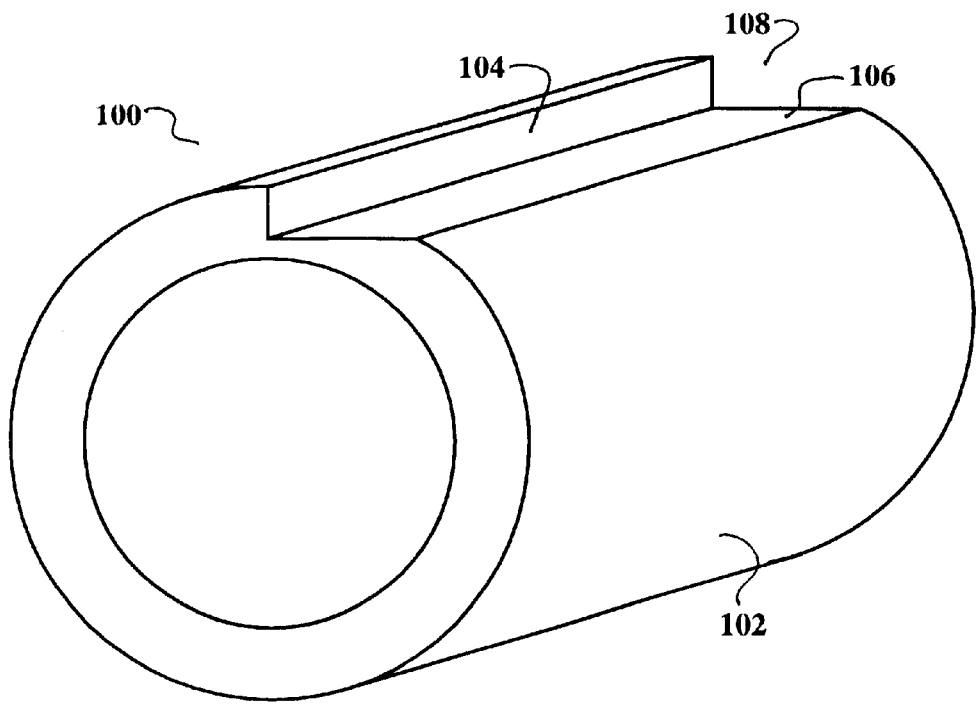
FIG. 1b is a perspective view of a tube according to the preferred embodiment of the invention.

FIG. 1a is a cross sectional view of one embodiment using a frame member or tube 100, in a plane perpendicular to its axis, according to this embodiment of the invention. FIG. 1b is a perspective view of a section of the tube100. Tube 100 is depicted to be circular, however, other cross sections, such as ellipses, ovals, or polygonal figures are all possible without departing from the essence of the invention. Tube 100 is pictured to be hollow, but it is obvious to use a solid member, or one having more complex internal structure. Tube 100 has an exterior surface 102 which defines the circumference of the tube 100. Exterior surface 102 is interrupted by peripheral wall 104 which cuts into the tube 100. Peripheral wall 104 and bottom 106 together define the outline and cross section of recess 108.

The cross section of tube 100 with recess 108, in a plane perpendicular to the axis of tube 100, may be described as the intersection of two partial chords of tube 100. In this case, neither bottom 106, nor peripheral wall 104 cut completely across tube 100 from one point on its circumference to another. As the partial chord defined by the peripheral wall 104 is radial, within the cross sectional plane, the recess 108 is only a fraction of the section which would be defined by two radii meeting the circumference of the tube 100 at the same locations as the partial chords defined by bottom 106 and peripheral wall 108. This section defined by recess 108 will be referenced herein as a partial chordal section.

Note too that bottom 106 necessarily has the geometric property of being parallel to some tangent of the circumference of tube 100. The points at which a tangent is parallel to a chord on a circular surface are those points which are directly perpendicular to the median of the total chord length. Tangents may be at other points on bodies or surfaces of other shapes. Bottom 106 may have projections, studs, or different depths at different portions of panel recess 108 and thus need not be entirely uni-planar; however, bottom 106 is uni-planar in the preferred embodiment shown.

In this embodiment, peripheral wall 104 is radial to the axis of tube 100 and is located at the median of a chord formed by projecting the partial chord defined by bottom 106 across the tube 100 to the opposite point on the exterior surface 102 of the tube 100. Thus peripheral wall 104 meets exterior surface 102 at the point on the circumference of tube 100 at which the partial chord defined by bottom 106 is parallel to the tangent to the circumference of the exterior surface 102 of the tube 100.

The result of this is that a flat body such as a panel 110 in FIG. 1c placed along the length of tube 100 will sit with its edge in recess 108. Further, if the panel 110 has a thickness equal to the radial depth of recess 108, measured from the tangent point where peripheral wall 104 meets exterior surface 102 to the bottom 106 or its chordal projection, the exterior surface of the panel 110 will meet exterior surface 102 of tube 100 at a smooth junction. In this preferred embodiment of the invention, the radial depth of recess 108 is equal to the length of height of peripheral wall 104.

The cross section of FIG. 1a can also be visualized as an end view of the tube 100. Tube 100 may have one or more ends for connection with other components. Tube 100 may branch and form any one of many complex shapes, for example a "T" having three ends. The end of tube 100 is generally annular in shape, with a notch in the outline corresponding to the recess 108 in the exterior surface 102.

Panel recess 108 will generally be straight. While panel recess 108 may run the entire length of tube 100, as in the preferred embodiment, this is not necessary. In one equivalent obvious to those skilled in the art, panel recess 108 may span only a fraction of the length of the tube 100 to seat a flat body of length shorter than that of the tube 100 within recess 108. Panel recess 108 may also be considered to be an asymmetrical groove on exterior surface 102.

Tube 100 is only one component of the structural kit of the invention. Such a structural kit could contain any of a wide range and number of components including tube 100, panels 110, fittings 300 (see FIG. 3a), and special modifications of these. The structural kit may be organized so as to provide easy assembly of a predetermined structure, with all tubes 100, panels 110, and fittings 300 necessary to the task, as well as fasteners, special parts, and so on. One such kit may be used to make a storage box, a second kit having different components may be used to build a storage shed, and a third kit may be used construct a trailer. Many additional possibilities are obvious.

The tube or frame member 100 may be constructed in many ways, and composed of a wide range of materials. Tube 100 may be extruded, machined, milled, rolled, or constructed by any other method. For example, the construction of a square tube out of four strips of material is obvious to those skilled in the art. Recess 108 also may be created as tube 100 is extruded, machined, etc, or, recess 108 may be created after tube 100 is finished, by machining, etching, or other finishing process. Tube 100 may be constructed of any of a wide range of materials, including but not limited to, metal, metal alloys, wood, plastic, rubber, other polymers, composites and so on. Tube 100 may be any length or diameter.

Figure 2A:
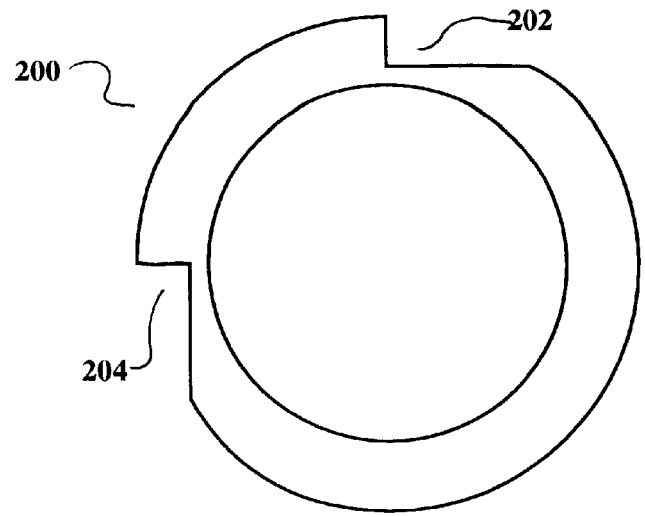
FIG. 2a is a cross sectional view of a tube, in a plane perpendicular to its axis, according to a first alternative embodiment of the invention.
Figure 2B:
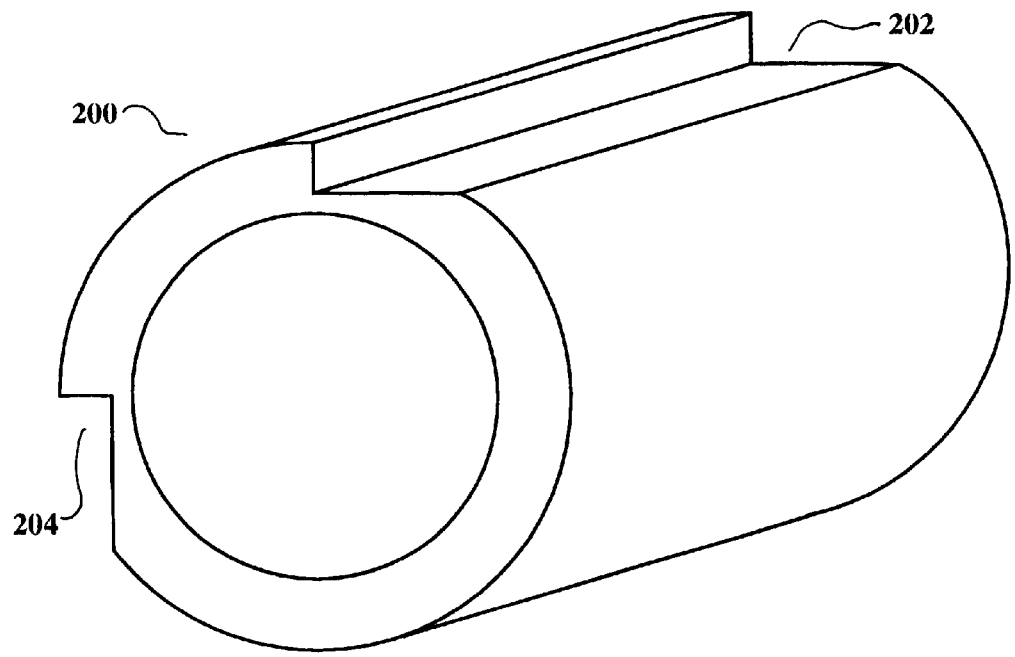
FIG. 2b is a perspective view of a tube according to the preferred embodiment of the invention.

FIG. 2a is a cross sectional view of tube 200, in a plane perpendicular to its axis, according to a first alternative embodiment of the invention. FIG. 2b is a perspective view of tube 200 according to this alternative embodiment. Tube 200 has first recess 202 and second recess 204. Recess 202 and recess 204 are depicted to be at an angle of 90 degrees to each other, in an orientation allowing flat bodies nestled within them to be perpendicular to each other. This is not necessary—an angular alignment of greater or less than 90 degrees may be desirable for the finished structure. It is even possible to conceive of structures requiring recess 202 and recess 204 be parallel or co-planar.

The invention may also have components with greater or lesser numbers of panel recesses. One member of the structural kit of the invention may have no panel recesses, another member may have more than two.

Figure 3A:
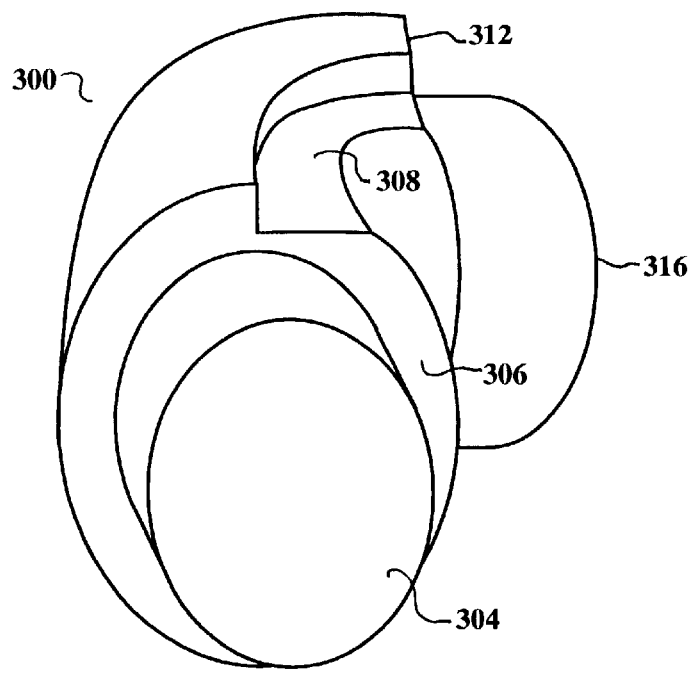
FIG. 3a is a perspective view of an elbow-type fitting according to the preferred embodiment of the invention.
Figure 3B:
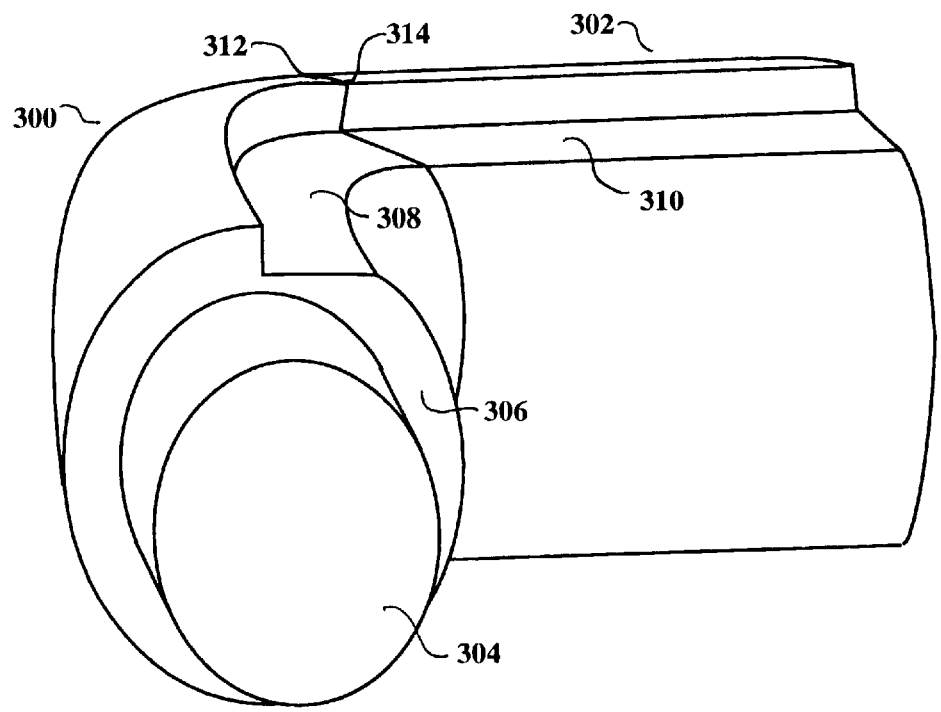
FIG. 3b is a perspective view of a mated fitting and tube according to the preferred embodiment of the invention.

FIG. 3a is a view of a fitting 300 according to the preferred embodiment of the invention. Fitting 300 has a first connector 304 projecting from a first annular face 306 and a second connector 316 projecting from a second annular face 312. FIG. 3b is a perspective view of fitting 300 mated with tube 302 wherein second annular face 312 abuts tube end 314. Annular face 312 and tube 314 are axially aligned. The cross section of annular face 312, in the plane perpendicular to this axis of alignment, is symmetrical to the cross section, in the same plane, of tube end 314.

Projecting from fitting 300 into tube 302 is connector 316, unseen in FIG. 3b. The shape of fitting 300 is semi-cylindrical. Fitting 300 has a smooth exterior resembling several intersecting tubes of the same diameter as tube 302. When tube 302 is connected to fitting 300, the joint is smooth, the tubular shape of tube 302 carrying across the joint to fitting 300. In the preferred embodiment of the invention, connector 304 and connector 316 are cylindrical. Tube 302 has an unseen tubular interior of the same diameter as the connector 316. Tube 302 fits snugly over the connector 316, providing a tight mating.

Fitting 300 and tube 302 are angularly aligned. Tube 302 has recess 310. Matching recess 310, fitting 300 has panel recess 308. When tube 302 is mated to fitting 300 and recess 308 is properly aligned with recess 310, the two merge into a single larger recess. The recesses 308 and 310 on fitting 300 and tube 302, respectively, may be alternately disposed along the exterior of the angle formed by the fitting 300 and tube 302, creating an interior corner for defining an aperture in a paneled surface, such as a window.

Recess 308 may have a cross section, generally viewed in the plane perpendicular to the axis of the circumference of fitting 300 at any particular point, which varies in order to accommodate a flat surface matching recess 310 to the variable contours of fitting 300. However, the cross section of recess 308 will match that of recess 310 at annular face 312. Thereafter, the variations in cross section of recess 308 may change to maintain the desired surface across the contours of fitting 300 to accommodate a panel.

Connector 304, (which may be referred to as a connector, locator, guide, fastener, or by other terms) may be any of a wide range of mechanisms. In the preferred embodiment, it is a cylindrical body which frictionally engages the interior of tube 302 to provide a secure connection. However, connector 304 may be an adhesive, or a cylindrical body covered with adhesive, or any of the ingenious connectors found in the reference patents cited earlier and incorporated herein, or any of many obvious equivalents, all without departing from the scope of the invention.

Cylindrical connector 304 may be a solid projection from fitting 302, or it may be detachable. It may be rubber covered, or have circular or spiral flanges around the perimeter, to create a tighter joint or a pressure resistant seal. Connector 304 may also be equipped with a washer or O-ring, having a plan-form identical to annular face 306.

Fitting 300 is depicted with two annular faces, 306 and 312, and two connectors, 304 and 316, of the same size. However fitting 300 may also serve to connect tubes or other components of different diameters or even different cross sectional shapes. In addition, the invention contemplates the creation of structures having a smooth exterior, but the interior may be quite complex. Thus, annular face 306 might be symmetrical to the tube end 314 which mates to it, only in those regions which will be externally visible in the finished product. This is one obvious equivalent embodiment of the invention.

Although not preferred, recesses 308 and 310, in fitting 300 and tube 302, respectively, may be disposed such that a panel resting in recesses 308 and 310 is not tangential to the exterior surfaces of the fitting 300 and tube 302. The exterior surface of a structure in such an embodiment may not be externally smooth. Fitting 300 may be manufactured by any of the methods mentioned earlier in reference to tube 100, and may be made of any of the same materials. Fittings, tubes and panels need not necessarily all be of the same materials.

Figure 4:
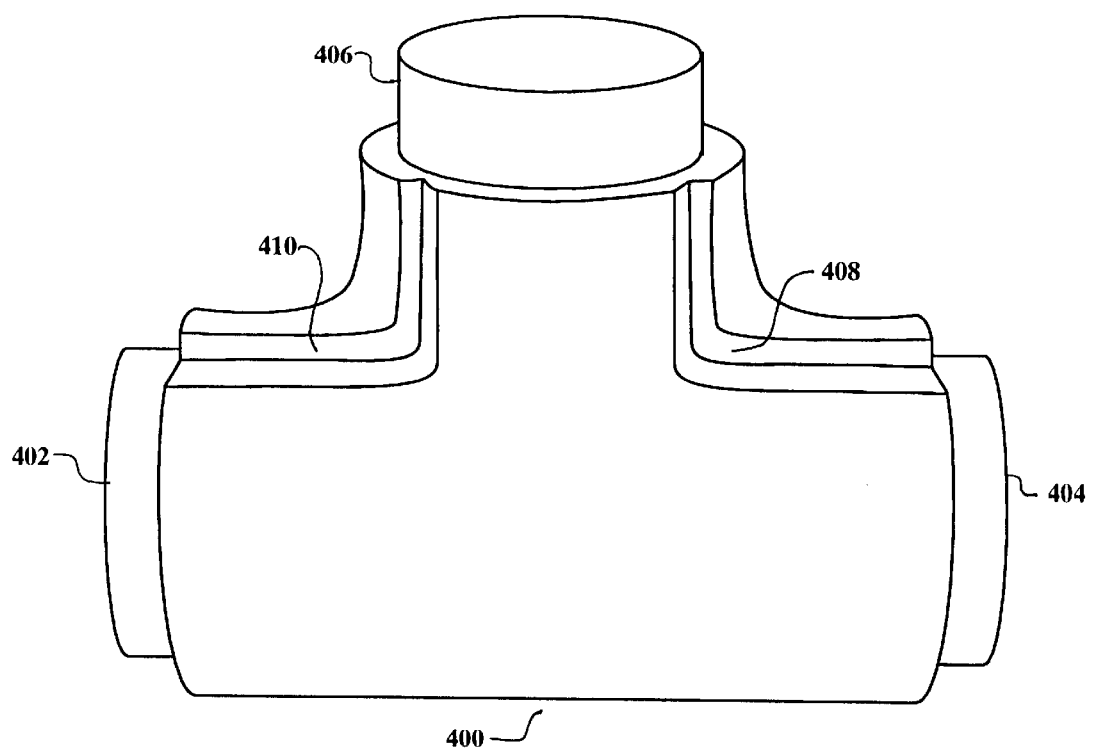
FIG. 4 is a perspective view of a T-type fitting according to the preferred embodiment of the invention.

FIG. 4 is a perspective view of a T-type fitting 400. Fitting 400 is designed to accommodate three tubes (not pictured) in a planar array. Thus fitting 400 has three connectors, 402, 404, and 406, and two panel recesses, 408 and 410. Fitting 400 might also have sufficient connectors and annular faces, in other embodiments, to accommodate almost any number of tubes, in planar or non-planar array. In particular, fitting 400 may have three orthogonal connectors and thus serve as a corner of a three dimensional structure. The corner need not be entirely composed of right angles, it may also include any desired angle, allowing for example streamlining of a trailer or for other reasons of convenience. The fitting 400 may also have more than three couplings.

Figure 5A:
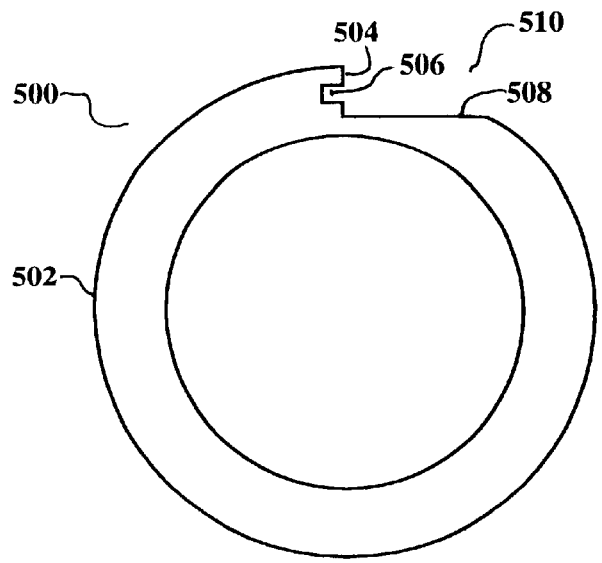
FIG. 5a is a cross sectional view of a tube, in a plane perpendicular to its axis, according to a second alternative embodiment of the invention.
Figure 5B:
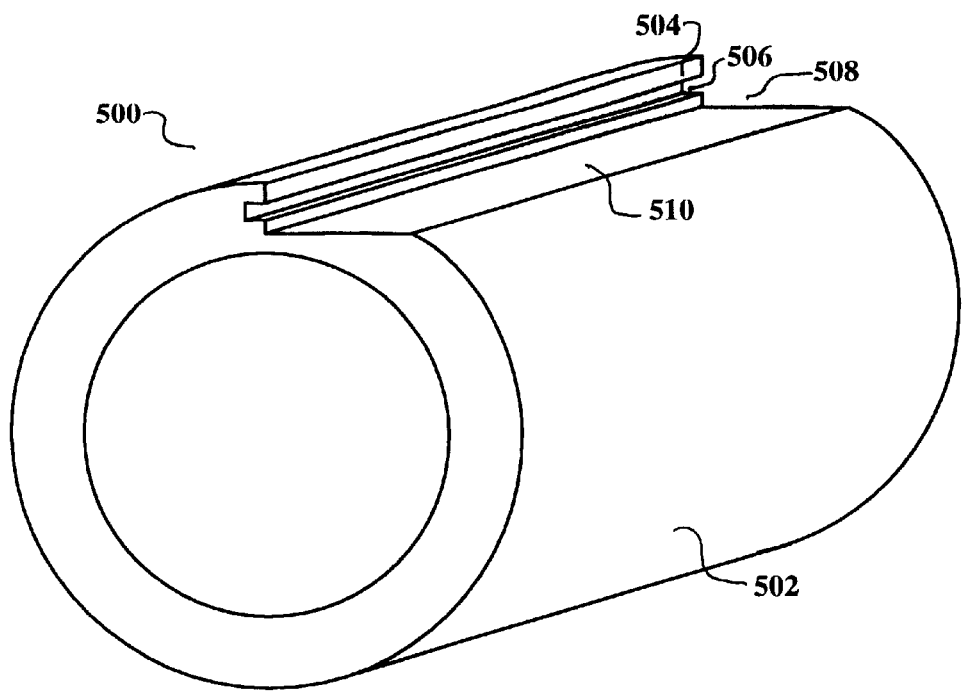
FIG. 5b is a perspective view of a tube according to a second alternative embodiment of the invention.

FIG. 5a is a cross sectional view of tube 500, in a plane perpendicular to its axis, according to a second alternative embodiment of the invention. FIG. 5b is a perspective view of tube 500 according this second embodiment. Tube 500 has exterior surface 502; peripheral wall 504, channel 506, and bottom 508 form recess 510. In this second embodiment of the invention, the panel (not shown) has at least one protrusion, a tab or flange, along the panel edge which engages channel 506. The panel is secured within recess 510 by the construct of channel 506.

Figure 6A:
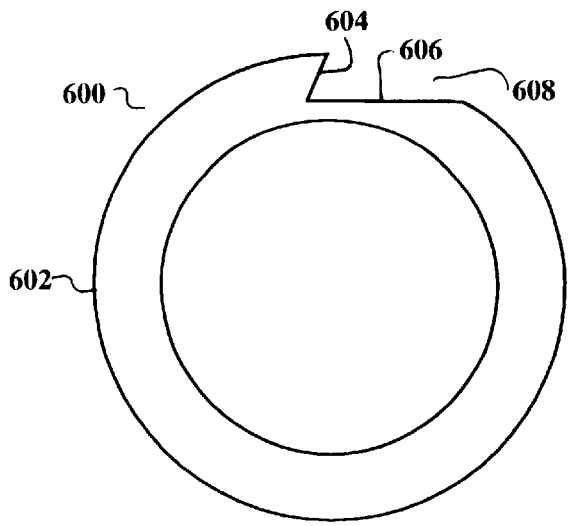
FIG. 6a is a cross sectional view of a tube, in a plane perpendicular to its axis, according to a third alternative embodiment of the invention.
Figure 6B:
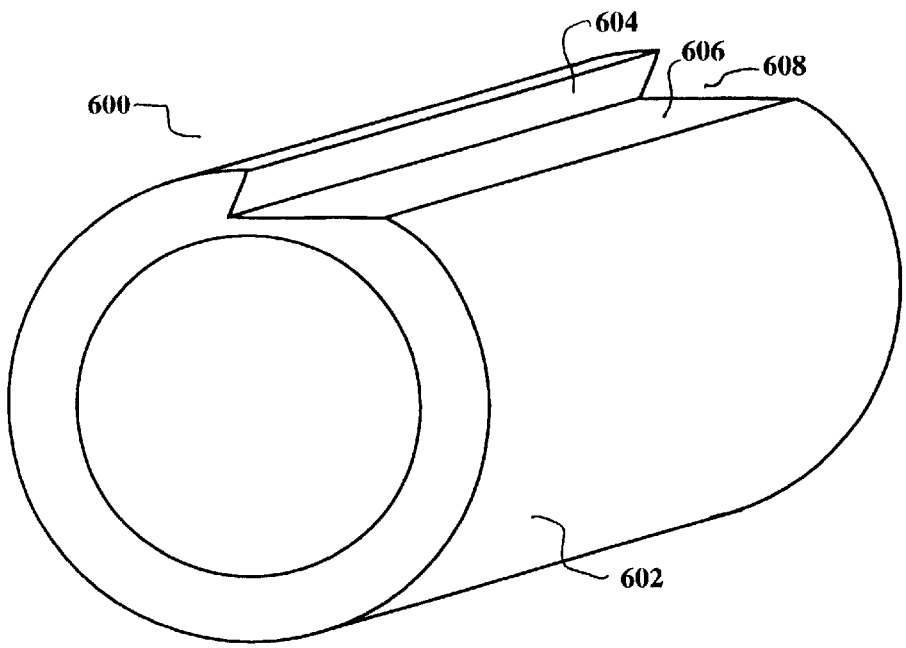
FIG. 6b is a perspective view of a tube according to a third alternative embodiment of the invention.

FIG. 6a is a cross sectional view of tube 600, in a plane perpendicular to its axis, according to a third alternative embodiment of the invention. FIG. 6b is a perspective view of tube 600 according this third embodiment. Tube 600 has exterior surface 602; peripheral wall 604 and bottom 606 define recess 608. In this third alternative embodiment of the invention, peripheral wall 604 is not radial to tube 600; rather, peripheral wall 604 and bottom 606 meet at an acute angle. Peripheral wall 604 and exterior surface 602 do, however, still meet at the point on exterior surface 602 radially outward from the median point of a chord projected by the bottom 606. As a result, the panel (not shown) still meets exterior surface 602 at an exact tangent. A complimentary panel has a cross section corresponding to the cross section of panel recess 608 with an acute angle on its edge allowing the panel to mate with and be secured within panel recess 608.

Figure 7A:
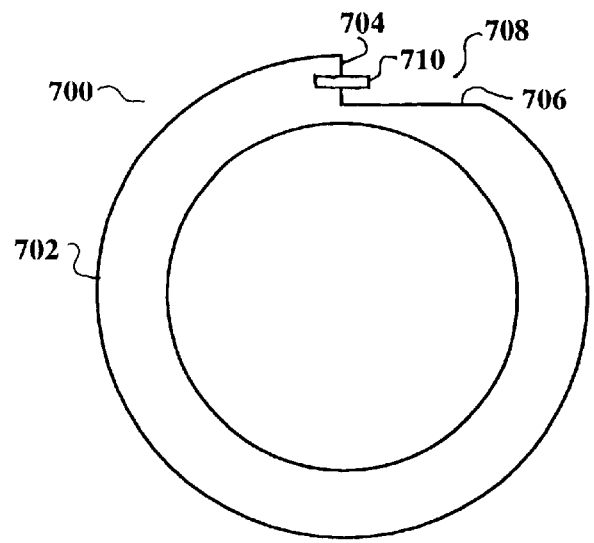
FIG. 7a is a cross sectional view of a tube, in a plane perpendicular to the tube axis, according to a fourth alternative embodiment of the invention.
Figure 7B:
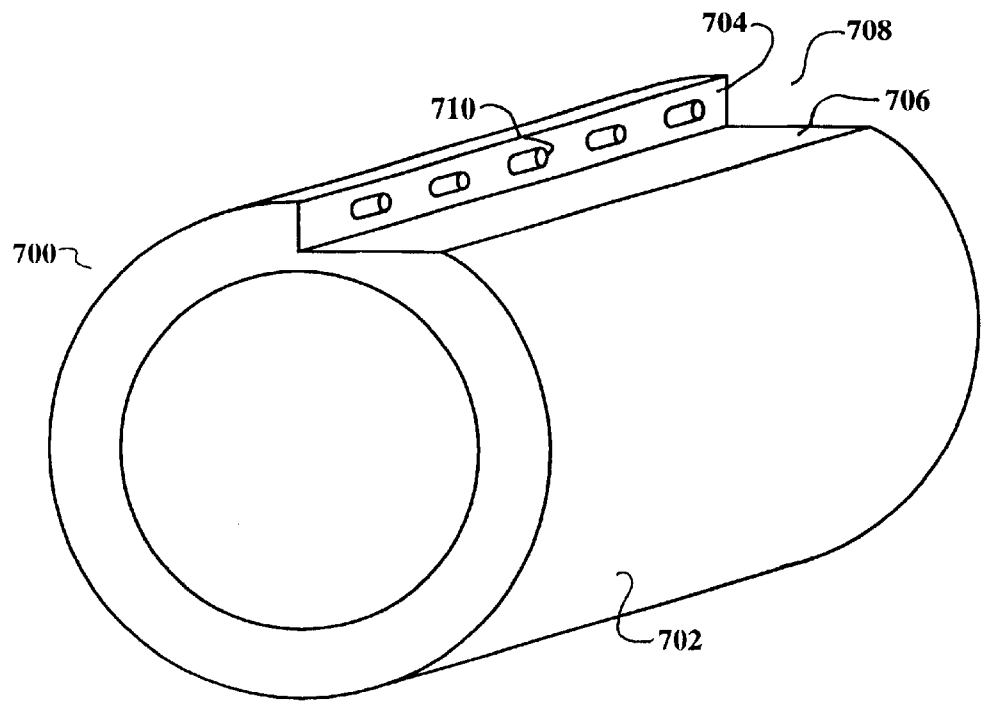
FIG. 7b is a perspective view of a tube according to a fourth alternative embodiment of the invention.

FIG. 7a is a cross sectional view of tube 700, in a plane perpendicular to its axis, according to a fourth alternative embodiment of the invention. FIG. 7b is a perspective view of tube 700 according this fourth embodiment. Tube 700 has exterior surface 702; peripheral wall 704 and bottom 706 form recess 708. Tube 700 may be made of any thickness desired, or may be solid, or may be solid for most of its length but have hollows at each end to receive fitting connectors (not shown).

A panel (not shown) is secured to tube 700 by the action of pins 710, which interpenetrate both the panel and peripheral wall 704. Peripheral wall 740 and the panel may have cavities prepared for pins 710, or the pins 710 may be driven into each, respectively. Pins 710 may be manufactured separately, or as part of tube 700, or as part of the panel. Pins 710 may also be replaced by dados in peripheral wall 704 and the panel with connecting biscuits.

Instead or in addition to the peripheral wall 704, bottom 706 may be similarly varied as shown in FIGS. 5a–7b; i.e., bottom 706 may have pins, channels, studs, or other indentations or projections. Bottom 706 may also vary in depth (as measured from the intersection of the peripheral wall 704 and the exterior surface 702) over its longitudinal direction if the panel is varied in thickness to match.

Figure 8A:
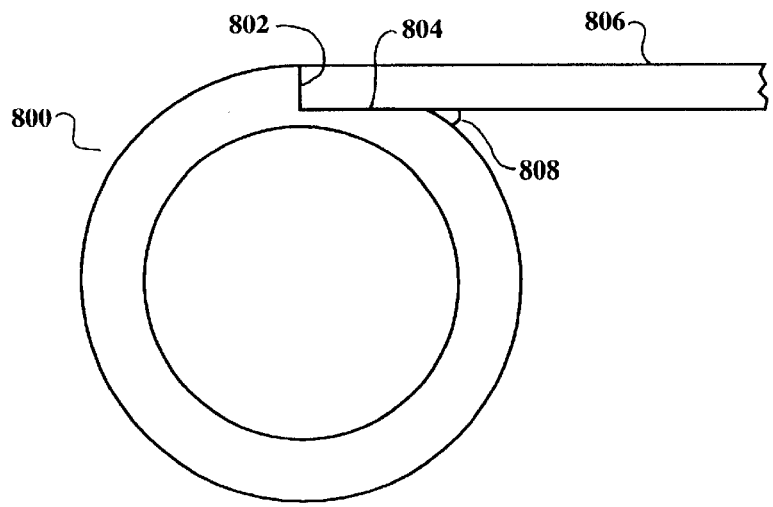
FIG. 8a is a cross sectional view of a tube mated to a panel, in a plane perpendicular to the tube axis, according to a fifth alternative embodiment of the invention.
Figure 8B:
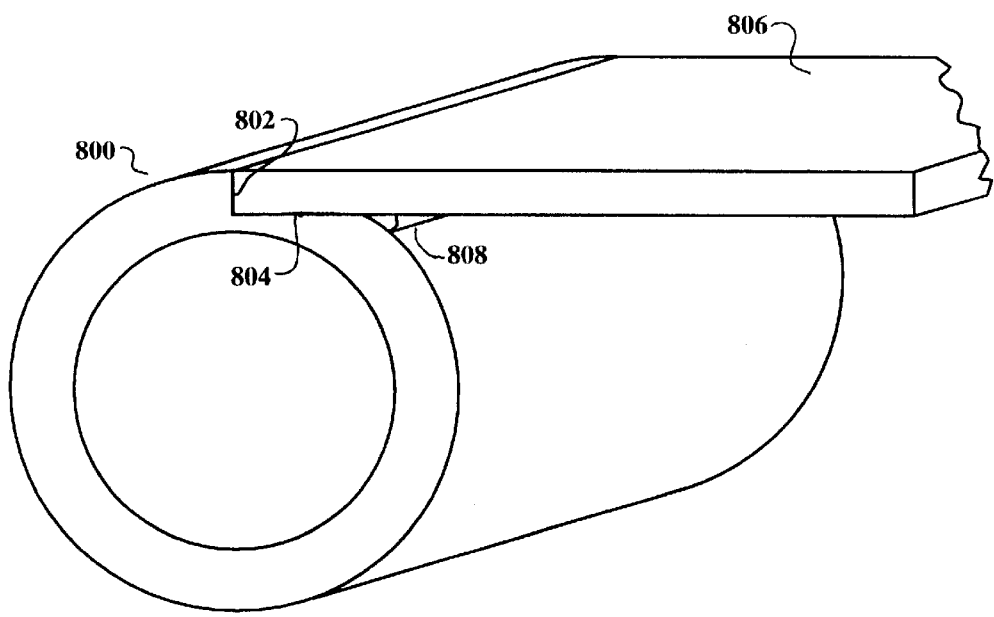
FIG. 8b is a perspective view of a tube mated to a panel according to a fifth alternative embodiment of the invention.

FIG. 8a is a cross sectional view of tube 800 mated to panel 806, in a plane perpendicular to the axis of tube 800, according to a fifth alternative embodiment of the invention. FIG. 8b is a perspective view of tube 800 mated to panel 806 according this fifth embodiment. Panel 806 abuts both peripheral wall 802, which mirrors the edge outline and thickness of panel 806, and bottom 804. In this fifth alternative embodiment of the invention, panel 806 is secured to tube 800 by a bead of welding 808 at their interior junction. While the bead of welding 808 may be located on the exterior junction, that embodiment somewhat mars the smoothness of the finished structure. Bead of welding 808 may be a normal longitudinal line or discontinuous as with spot welds.

Figure 9A:
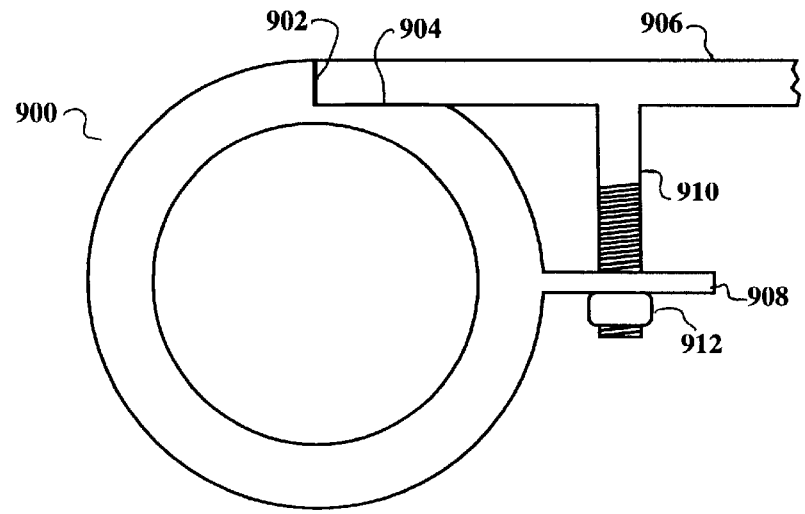
FIG. 9a is a cross sectional view of a tube mated to a panel, in a plane perpendicular to the tube axis, according to a sixth alternative embodiment of the invention.
Figure 9B:
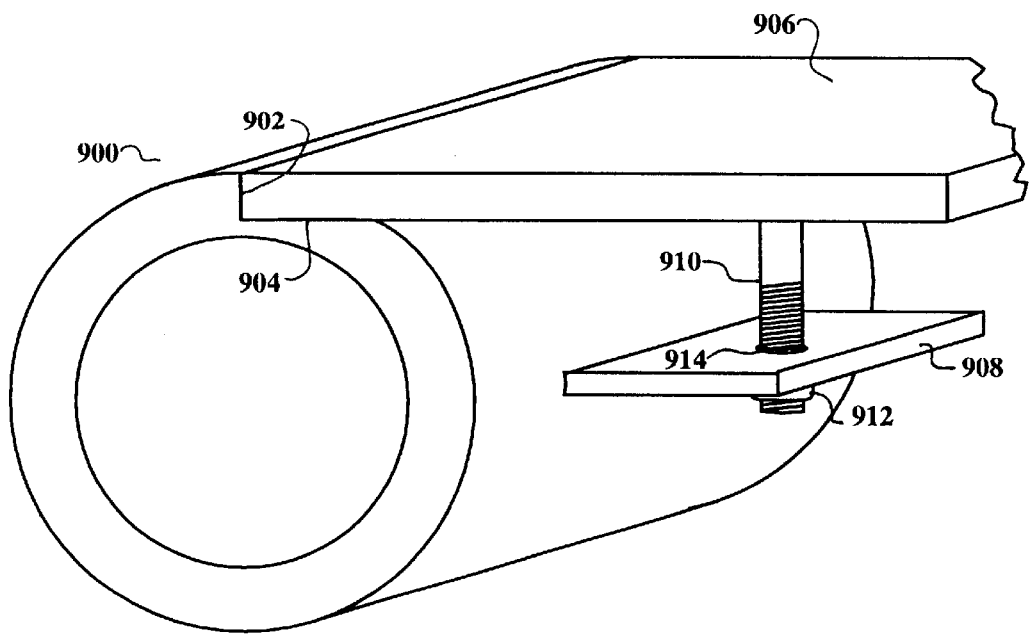
FIG. 9b is a perspective view of a tube mated to a panel according to a sixth alternative embodiment of the invention.

FIG. 9a is a cross sectional view of tube 900 mated with panel 906, in a plane perpendicular to the axis of tube 900, according to a sixth alternative embodiment of the invention. FIG. 9b is a perspective view of tube 900 mated with panel 906 according this sixth embodiment. This embodiment provides a more secure attachment of panel 906 to tube 900. Peripheral wall 902 and bottom 904 still hold panel 906 in a load bearing relationship, but the attachment is carried out elsewhere. Tube 900 has bracket 908, with an aperture 914 therein. Panel 906 has stud 910 which projects from panel 906, through bracket 908, and is secured therein. Bracket 908 may be equipped with a grommet (not shown) for better connection. In one alternative embodiment of the invention, stud 910 may be a screw or a bolt secured with a nut 912.

Figure 10:
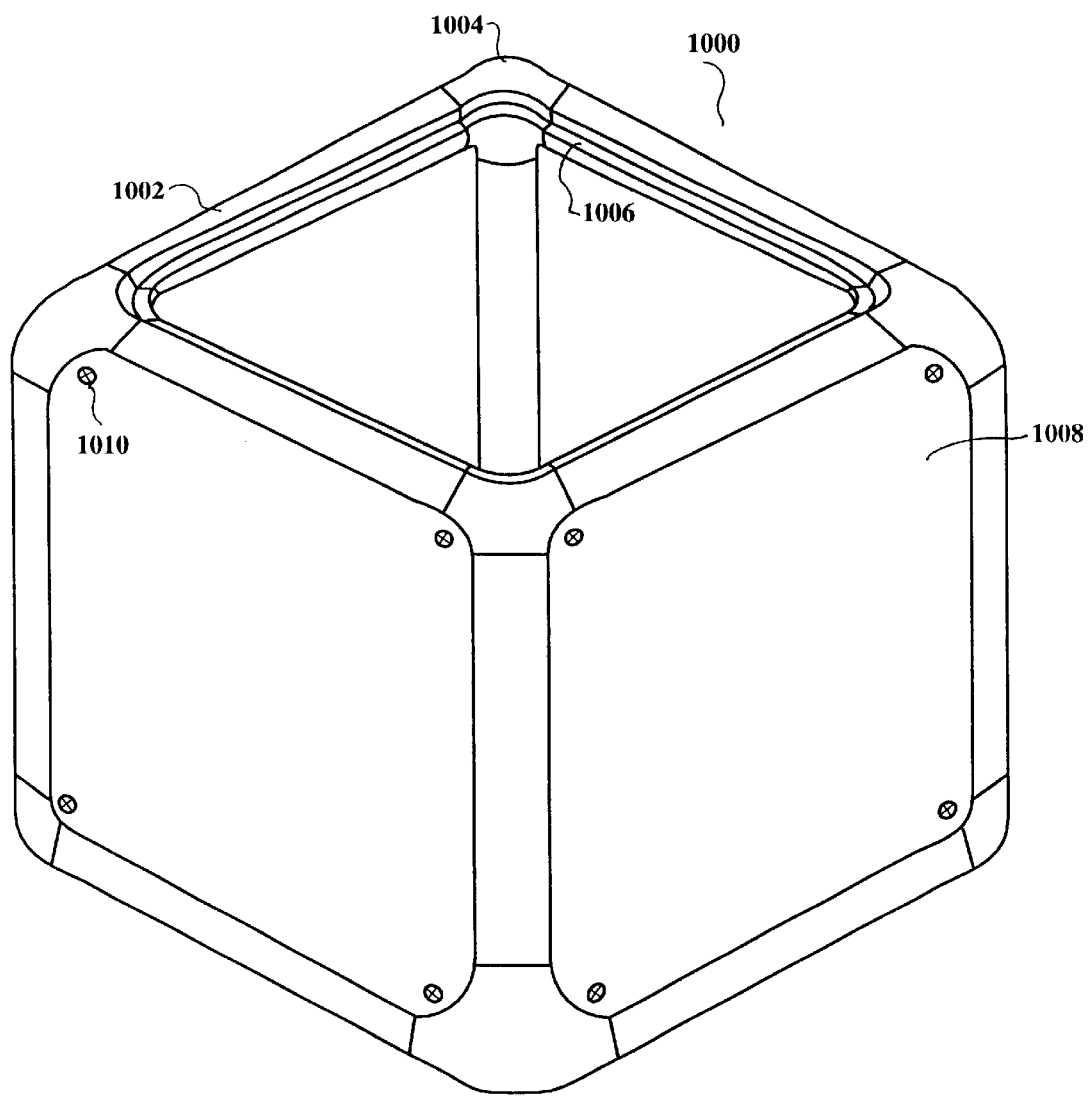
FIG. 10 is a perspective view of a structure constructed with the components and according to the methods of the invention.

In another alternative embodiment, bracket 908 is omitted, and a screw penetrates panel 910 and tube 900 through bottom 904 to secure them together. The screw head may be recessed, to retain streamlining of the exterior of the completed structure. Such a fastening method is shown in FIG. 10, which depicts a structure 1000 utilizing the components and methods disclosed herein. Structure 1000 is shown without a top panel so that the recess 1006 is visible. Panels 1008 are attached to the tubes 1002 and fittings 1004 with screws 1010. Many other variations of attachment apparatus and fastening methods will be obvious to those skilled in the art.

Figure 11:
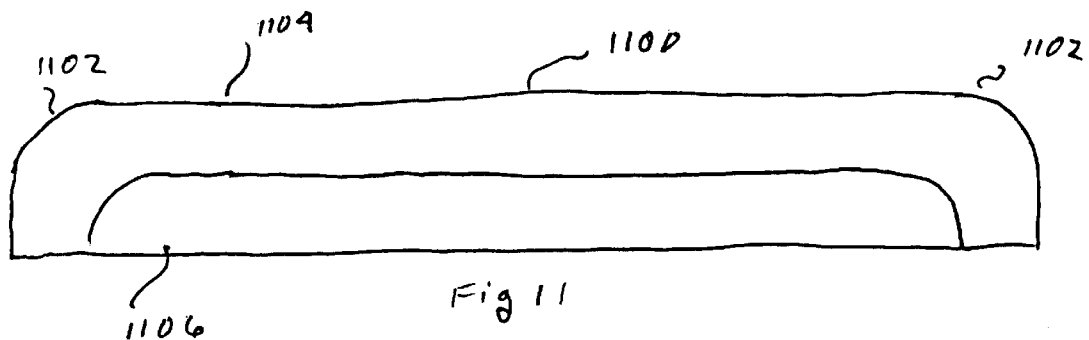
FIG. 11 represents another embodiment of the frame member with the end connectors integral to the side.
Figure 12:
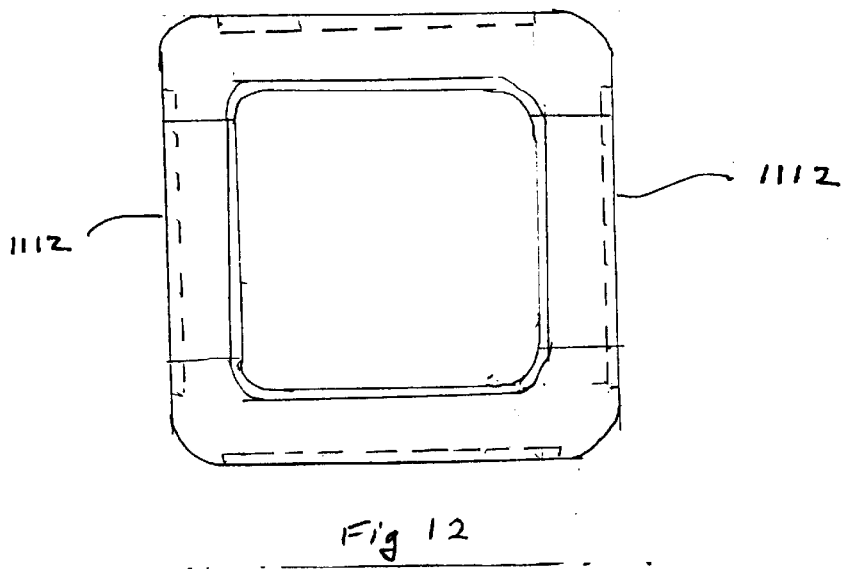
FIG. 12 represents the assembly of two similar frame members, and two cross members to form a complete frame into which panels would be inserted to complete the side or sides of the structure.
Figure 13:
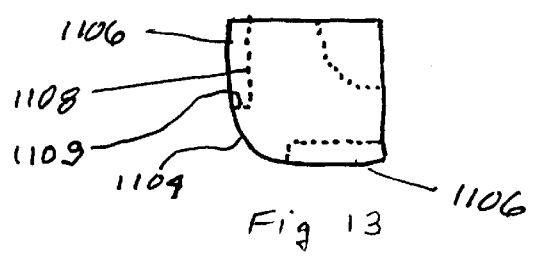
FIG. 13 represents an end view of one example of a frame member illustrating its exterior form with recesses for the panels on two sides and the interior surface being concave.
Figure 14:
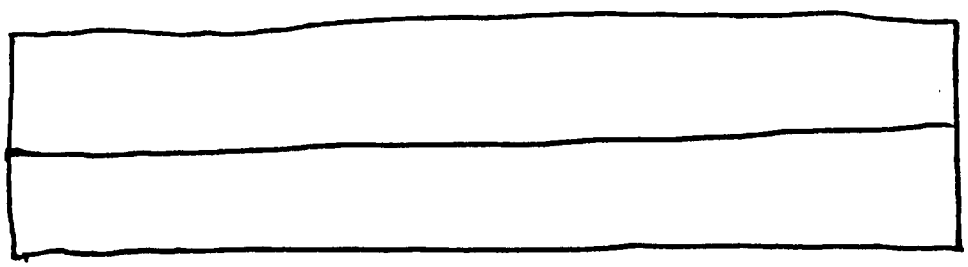
FIG. 14 represents a frame member without the end fittings for eomers, this would be a cross member.

The embodiment illustrated in FIG. 11 is a frame member 1100 with two corner connectors 1102 are attached or are integral to one frame member or side piece. One or two corner connections and one side piece may be made in one unit. It can also include a side and one corner connector as a single piece.

In FIG. 11 it is shown as a single piece with the corner connections all as one unit. The exterior surface 1104 of the frame member is rounded as in the other embodiment where it is the external surface of a rod or a tube like structure, to have a smooth surface from side panel around the corner of the frame member. The panel abuts the frame member at the peripheral wall with the exterior surface of the panel forming a tangential cord to the frame member's surface. The panel sits in the recess space 1106 created by the two surfaces to yield a tangential mating of the exterior surface. The bottom surface 1108 interfaces with the inside surface of the side panel and the peripheral wall 1109 mates with the edge of the side panel.

This embodiment has advantages of construction as it can be made from easily accessible materials, such as wood, plastic, metal stock with the bottom and peripheral walls or panel channels being formed by mills, routers or other tools.

The embodiment may be made out of lengths of any suitable material. As an example, it may readily be formed from 2×2 wood with the panel channels being cut out of one of the sides. The ends would form the connections with cross pieces 1112, also made of 2×2 wood, with the panel channels appropriately formed in them.

The exterior corners 1102, both of the sides of the frame member and the ends of the connector sections would be rounded by any common method to yield the curved exteriors of the within invention.

Figure 15:
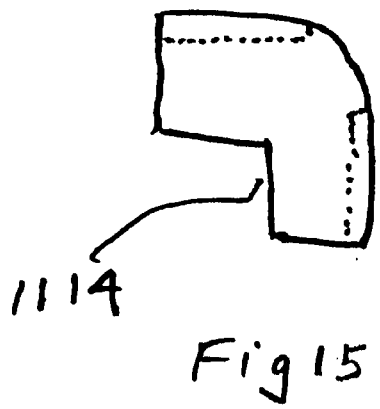
FIG. 15 represents an end view of an example of a cross member showing its interior flat surfaces and the recesses for panels.

The inside surface of the frame members may be formed, machined or created in any suitable shape, such as an inside corner 1114 in FIG. 15, a curved or a flat, or other surface to accommodate attachments on the inside of the structure, such as drawer or shelf anchors.

The advantage of being made out of common stock allows for customization and easy repair. The end connection sections also allow for common attachment methods between the frame member and cross members. Additionally, making the corner ends and the intervening side piece as a single piece, there is less assembly required. Finally the end and side piece as a unitized frame member yields greater structural strength to that frame member including the end connector parts. This would help in loading of the complete frame.

In addition to the various mechanical fasteners discussed above, the panel may be secured to the panel recess using adhesives disposed between the contact surfaces of the two components. More than one type of fastener may also be used at the same time. Similarly, the various embodiments discussed above may be combined in one structure or even in one component without departing from the scope of the invention.

The invention and the best known mode of working it have been disclosed above in order allow practice of the invention by those skilled in the art, subject to retained patent rights. Many equivalents, substitutions and alternatives beyond those specifically detailed above will be obvious to those skilled in the art, without departing from the scope of the invention. Nothing in the above disclosure in any way limits the scope of the invention, which is limited only by the claims below.

I claim:

1. A structural kit comprising:
   a) at least one tube having exterior and interior surfaces, the tube further having first and second tube ends, the tube further having a first recess extending lengthwise from the first tube end to the second tube end, the first recess having a bottom wall and a peripheral wall which define a space, the first recess comprising a partial chordal section of the tube;
   b) at least one fitting having first and second coupling faces, the first coupling face being symmetrical to the first tube end;
   c) means for coupling the fitting to the tube with the first coupling face abutting and aligned with the first tube end;

d) a panel having interior and exterior surfaces, the panel further having a panel edge which matches in outline, thickness, and cross section the space defined by the first recess; and panel edge the combined recess; and e) means for securing the panel edge within the first recess, whereby the exterior surface of the panel is tangential to the exterior surface of the tube.

2. The structural kit of claim 1, wherein:

a) the fitting further comprises a second recess extending from the first coupling face to the second coupling face, the second recess at the first coupling face symmetrical to the first recess;

b) the means for coupling the fitting to the tube further comprises means for aligning the first and second recesses, whereby the first and second recesses combine to form a combined recess which defines a combined space; and c) the panel edge matches in outline, thickness, and cross section the combined space defined by the combined recess.

3. The structural kit of claim 1, wherein the means for coupling the fitting to the tube comprises at least one connector projecting from the first coupling face of the fitting, the connector being shaped to engage the interior surface of the tube.

4. The structural kit of claim 3, wherein the connector further comprises at least one circumferential O-ring around the connector having an outside diameter slightly greater than the internal diameter of the tube.

5. The structural kit of claim 3, wherein the connector further comprises a plurality of circumferential ribs of an elastic material around the connector having an outside diameter slightly greater than the internal diameter of the tube.

6. The structural kit of claim 3, wherein the connector is integral to the fitting.

7. The structural kit of claim 3, wherein the connector is detachable from the fitting.

8. The structural kit of claim 1, wherein the means for securing the panel edge within the first recess further comprises:

a) a channel in the peripheral wall; and b) the panel edge further comprising a tab having the same dimensions as the channel.

9. The structural kit of claim 1, wherein the means for securing the panel within the first recess further comprises:

a) the peripheral wall oriented at an acute angle to the bottom wall; and b) the panel edge matched in outline, thickness, and cross section the space defined by the first recess.

10. The structural kit of claim 1, wherein the means for securing the panel within the first recess further comprises at least one pin interpenetrating the peripheral wall and the panel edge.

11. The structural kit of claim 1, wherein the means for securing the panel within the first recess further comprises:

a) at least one bracket projecting from the tube, the bracket having a hole; and b) at least one fastening stud projecting from the panel through the hole in the bracket, whereby the stud is secured to the bracket.

12. The structural kit of claim 1, wherein the means for securing the panel within the first recess further comprises at least one screw penetrating through the panel and into the tube, wherein the head of the screw is recessed in the panel.

13. The structural kit of claim 1, wherein the means for securing the panel within the first recess further comprises a welding bead connecting the panel and the tube.

14. The structural kit of claim 1, wherein the means for securing the panel within the first recess further comprises an adhesive disposed between the first recess and the panel.

15. The structural kit of claim 1, wherein the fitting further comprises at least one additional coupling face.

16. A structural kit comprising:

a) at least one frame member having a longitudinal axis and exterior and interior surfaces, the exterior surface of said frame member having a circular cross-sectional configuration, the frame member further having first and second ends, the frame member having a first recess extending lengthwise from the first end to the second end along the exterior surface of the frame member and parallel to the longitudinal axis of the frame member, the first recess having a bottom wall and an intersecting peripheral wall, the first recess comprising a partial chordal section of the exterior circular surface of the frame member;

b) at least one fitting having first and second coupling faces, the first coupling face being symmetrical to the first frame member end;

c) means for coupling the fitting to the frame member with the first coupling face abutting and aligned with the first frame member end;

d) a panel having interior and exterior surfaces, the panel further having a panel edge which matches in outline and cross section of the first recess, the panel edge has a thickness defined by the exterior and interior surfaces of the panel;

e) means for securing the panel edge within the first recess; and f) the thickness of the panel edge equals the dimension between the bottom wall of the first recess and the edge of the exterior surface of the frame member at the peripheral wall so that when the panel edge is secured within the first recess the exterior surface of the panel is even with and tangential to the exterior circular surface of the frame member.

* * * * *